United States Patent [19]

Ostrovsky

[11] Patent Number: 5,606,499

[45] Date of Patent: Feb. 25, 1997

[54] METHOD AND APPARATUS FOR DETERMINING A ZONE IN AN OBJECT EXHIBITING A HIGHEST LEVEL OF STRUCTURAL ORGANIZATION

[75] Inventor: Emil Y. Ostrovsky, Moscow, Russian Federation

[73] Assignee: Target Strike, Inc.

[21] Appl. No.: 388,158

[22] Filed: Feb. 13, 1995

Related U.S. Application Data

[63] Continuation-in-part of Ser. No. 127,305, Sep. 27, 1993, abandoned.
[51] Int. Cl.$^6$ .............................. G01V 1/00; G01V 3/00; G01V 5/00; G06F 17/00
[52] U.S. Cl. ............................................................ 364/420
[58] Field of Search .................................. 364/420–422; 367/14, 25, 13; 324/323–375; 395/928–931

[56] References Cited

U.S. PATENT DOCUMENTS

| | | | |
|---|---|---|---|
| 4,837,723 | 6/1989 | Peacock | 364/724.01 |
| 5,369,578 | 11/1994 | Roscoe et al. | 364/422 |
| 5,469,062 | 11/1995 | Meyer, Jr. | 324/338 |

*Primary Examiner*—Gail O. Hayes
*Assistant Examiner*—Steven R. Yount
*Attorney, Agent, or Firm*—Donald R. Comuzzi; Christopher L. Makay

[57] ABSTRACT

A method and apparatus utilizes either a targetless approach or a target oriented approach to determine "attractors" in data fields of a physical property or set of physical properties of an object. A processing system implements the method which begins by first inputting a data field of a physical property or data fields of a set of physical properties of the object. Second, the processing system arranges the data of the data field or the data of each data field into a matrix. Third, the processing system transforms the data within the matrix or matrices to develop transformation matrices. Fourth, the processing system develops a base dichotomy matrix from each transformation matrix. Fifth, the processing system develops a full description set of matrices from the base dichotomy matrices. Sixth, in the targetless approach, the processing system selects the roots of the full description set of matrices and organizes the roots into sequences, or, alternatively in the target oriented approach, the processing system selects the branches of the full description set of matrices. Finally, the processing system displays either the roots in sequences to provide a representation of a zone within the object exhibiting a highest level of structural organization or the branches to provide a representation of a zone within the object exhibiting a highest level of structural similarity to a target zone within the object.

34 Claims, 5 Drawing Sheets

|       | $M_1$ | $M_2$ | $M_3$ |
|-------|-------|-------|-------|
| $M_1$ | 1.0   | 0.7   | 0.9   |
| $M_2$ | 0.7   | 1.0   | 0.8   |
| $M_3$ | 0.9   | 0.8   | 1.0   |

DEGREE OF SIMILARITY NUMBER $M_1$ AND $M_1$ = 1.0
$M_1$ AND $M_2$ = 0.7
$M_1$ AND $M_3$ = 0.9
$M_2$ AND $M_2$ = 1.0
$M_2$ AND $M_3$ = 0.8
$M_3$ AND $M_3$ = 1.0

METHOD AND APPARATUS FOR DETERMINING A ZONE IN AN OBJECT EXHIBITING A HIGHEST LEVEL OF STRUCTURAL ORGANIZATION

CROSS-REFERENCE TO RELATED APPLICATION

This application is a continuation-in-part of application Ser. No. 08/127,305, filed Sep. 27, 1993 and now abandoned.

BACKGROUND OF THE INVENTION

1. Field of the Invention

The present invention relates to a method and apparatus for determining "attractors" in data fields of a physical property or set of physical properties of an object.

2. Description of the Related Art

Many current methods of object exploration involve the analysis of data fields for observed physical properties of the object such as the strength of physical fields (e.g., magnetic, radioactive, gravitational, infrared, and electromagnetic) to deduce the location and range of significant features within the object. There are two principal approaches for analyzing data fields to detect significant features within the object. The first approach is pattern recognition which involves comparing a data field to other data fields representing physical properties of areas known to possess a desired significant feature. When certain patterns are common to the data fields, the presence of the desired significant feature in the survey area under investigation is indicated. The second approach is the use of an "expert system" that classifies data according to a complex scheme that employs many variables and uses decision-making rules subjectively selected by an investigator based on his own experience, knowledge, and intuition.

Unfortunately, pattern recognition methods and "expert system" technology suffer from several disadvantages. First, they are biased in that they produce outcomes that are heavily influenced by past occurrences of significant features, as in the case of pattern recognition, or by the selection criteria chosen by the investigator. As a result of such a bias, more meaningful occurrences of significant features within the data may be suppressed in favor of features that are less meaningful, but that happen to correlate with a previously observed feature or a feature predicted to be meaningful by an investigator. Second, the aforementioned methods are directive because judgments of correlation between features in the data fields are made with the target features in mind. Thus, at each opportunity for deciding whether sufficient correlation exists, incremental preferences for the predetermined target feature are introduced. Accordingly, neither method permits natural meaningful features within the data fields to be detected without the influence of a target feature selected beforehand by the investigator.

SUMMARY OF THE INVENTION

In accordance with the present invention, a method and apparatus utilizes either a targetless approach or a target oriented approach to determine "attractors" in data fields of a physical property or set of physical properties of an object. A processing system implements the method which begins by first measuring and digitizing a data field of a physical property or data fields of a set of parameters. Second, the processing system arranges the data of the data field or the data of each data field into a matrix. Third, the processing system transforms the data within the matrix or matrices to develop transformation matrices. Fourth, the processing system develops a base dichotomy matrix from each transformation matrix. Fifth, the processing system develops a full description set of matrices from the base dichotomy matrices. Sixth, in the targetless approach, the processing system selects the roots of the full description set of matrices and organizes the roots into sequences, or, alternatively, in the target oriented approach, the processing system selects the branches of the full description set of matrices. Finally, the processing system displays either the roots in sequences to provide a representation of a zone within the object exhibiting a highest level of structural organization or the branches to provide a representation of a zone within the object exhibiting a highest level of structural similarity to a target zone within the object.

It is, therefore, an object of the present invention to provide an unbiased targetless method and apparatus for determining "attractors" in data fields of a physical property or set of physical properties of an object.

It is another object of the present invention to provide a target oriented method and apparatus for determining "attractors" in data fields of a physical property or set of physical properties of an object.

Still other objects, features, and advantages of the present invention will become evident to those of ordinary skill in the art in light of the following.

DETAILED DESCRIPTION OF THE PREFERRED EMBODIMENT

Figure 1:
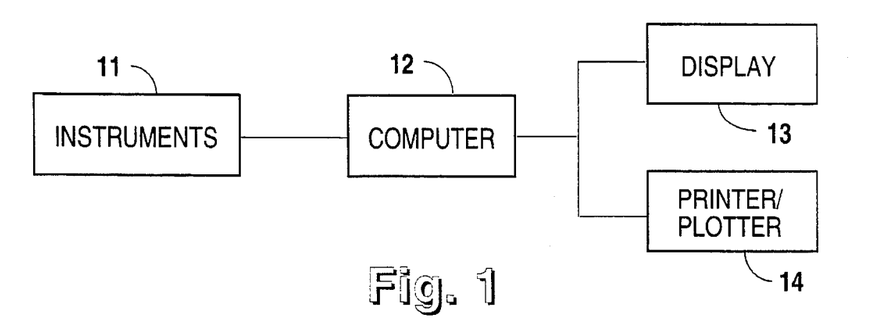
FIG. 1 is a block diagram illustrating a processing system implementing the preferred embodiment of the present invention.

FIG. 1 illustrates processing system 10 that inputs and processes data of a physical property or set of physical properties of an object to determine "attractors" within the object. "Attractors" are the most stable states of an observed data field which are the best cumulative representations of the entire diversity (variations) of the object. Processing system 10 receives input from instruments 11 which measure any physical property or combination of physical properties found in an object and provide a digitized data representation of the measured physical property or properties. Alternatively, if instruments 11 produce only analog output, an analog-to-digital converter may be employed to produce the necessary digitized data representation of the physical property or properties.

Example physical properties include but are not limited to magnetic field, gravitational field, radioactive field, and seismic field. Instruments 11 are any suitable devices capable of measuring physical properties such as magnetometers and gamma-spectrometers. Although FIG. 1 illustrates a connection between instruments 11 and processing system 10, those skilled in the art will recognize that instruments 11 may be remote from processing system 10 and that any data from a measured physical property or set of physical properties may be stored in a storage device such as magnetic media or laser disk for later input into processing system 10.

Processing system 10 determines the "attractors" in the data fields of the physical property or set of physical properties because "attractors" correspond to zones within the object that exhibit a highest level of structural organization or structural similarity to a target zone within the object. By locating the zones, processing system 10 indicates specific regions within the object that are most suitable for the realization of the physical, chemical, and other natural processes that create significant features within the object such as ore, oil, and gas deposits. Consequently, processing system 10 provides a user with an indication of the zones within an object having the highest probability of containing significant features.

Processing system 10 includes computer 12, which has a suitable input device such as a keyboard, to determine the "attractors" in the data fields of the physical property or set of physical properties. Computer 12 generates images of an object that include zones of "attractors" and displays the images on display screen 13 and, if desired, prints the images on printer/plotter 14. In determining the "attractors" in the data fields of the physical property or set of physical properties of the object and furnishing a representation of those "attractors" to a user, processing system 10 optimizes the evaluation process of objects.

Figure 2:
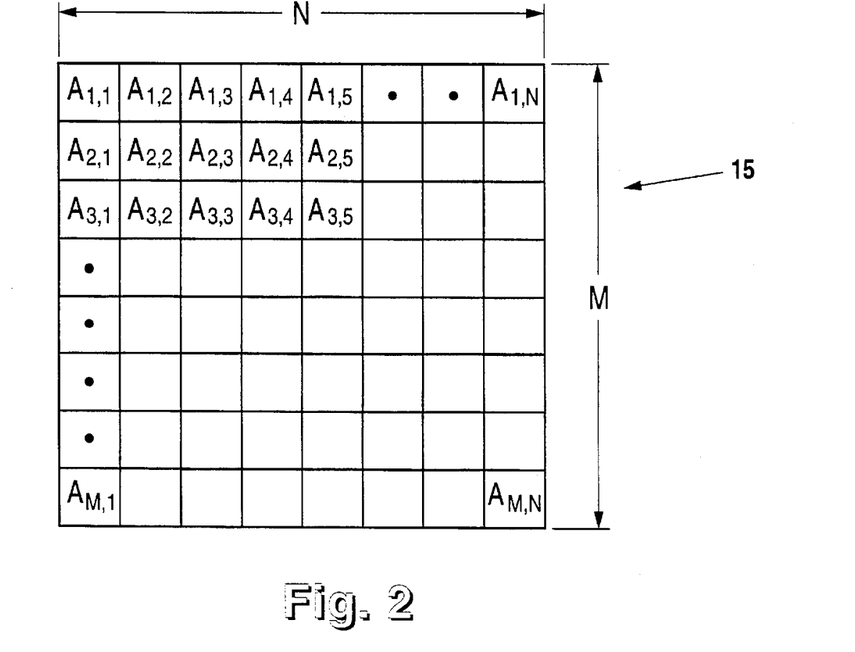
FIG. 2 is a diagram illustrating the format for data of a data field for a physical property or set of physical properties of an object.

FIG. 2 illustrates the format for the data of the data field representing a physical property of an object. One of instruments 11 measures the physical property to produce data for input into computer 12. Computer 12 stores the data in its memory in a matrix format that includes N columns and M rows. Matrix 15 includes cells $A_{1,1}-A_{M,N}$ that correspond to measurement points within the object. The data representation within each cell $A_{1,1}-A_{M,N}$ of matrix 15 may be any suitable numeric form and need not be of any particular sign, significant value, or base number system.

For the determination of "attractors" in the data fields of a set of physical properties of an object, appropriate ones of instruments 11 each measure a physical property to produce data for input into computer 12. Computer 12 inputs the data and stores each physical property data in a separate matrix that includes N columns and M rows and cells $A_{1,1}-A_{M,N}$. Furthermore, computer 12 arranges each matrix in its memory such that the individual cells of the matrices remain in "spatial registry". That is, each of the cells having the same row and column determination is aligned in the memory of computer 12 so that computer 12 may easily compare corresponding matrix cells during the determination of "attractors" in the data fields of the set of parameters. Although this preferred embodiment organizes the data of the data fields utilizing a matrix format, that format is employed only in as much as it provides an effective arrangement and marking of the individual data of the data fields. Those of ordinary skill in the art will recognize that any format that furnishes coordinates for each individual data of the data field such as a cartesian coordinate system or multi-dimensional matrix may be substituted.

Figure 3:
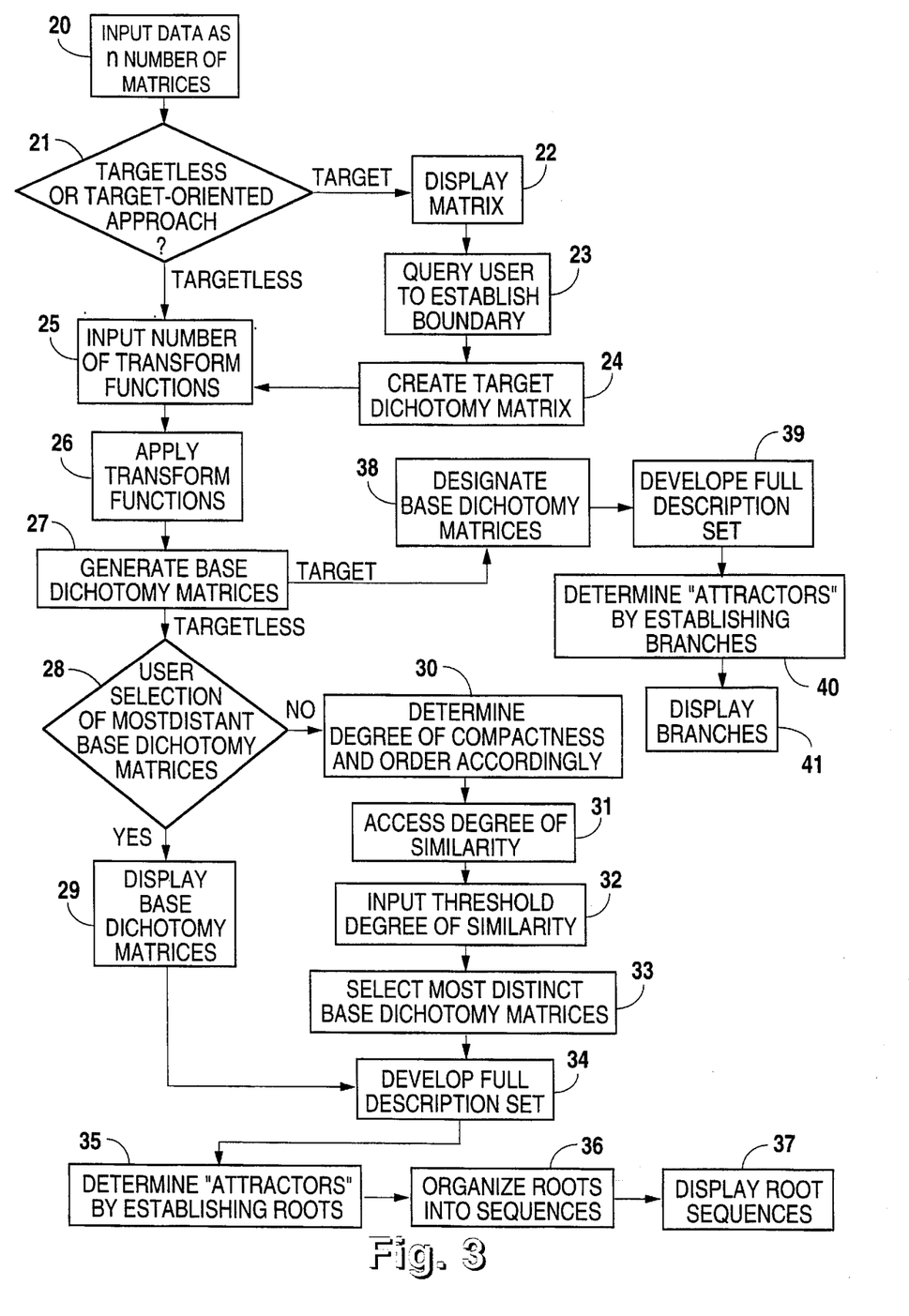
FIG. 3 is a flow diagram illustrating the steps performed by the processing system of FIG. 1.

FIG. 3 illustrates the steps performed by computer 12 to determine "attractors" in the data fields of a physical property or a set of physical properties of an object. In step 20, computer 12 inputs into its memory physical property data of an object as an n number of matrices (n>=1) as previously described. After inputting the n matrices, computer 12 in step 21 queries the user to select whether a target oriented approach or a targetless approach will be employed to determine "attractors". The target oriented approach is utilized when an object includes a known significant feature. Illustratively, a known significant feature may be a mineral deposit such as a gold-quartz outcrop, a kimberlite pipe, or an oil field. Conversely, the targetless approach is employed when an object includes no known significant feature.

If the user selects the target oriented approach, computer 12 in step 22 displays a matrix representing the object on display 13 and, in step 23, queries the user to draw a boundary around the portion of the matrix including the known significant feature or, alternatively, designate the specific matrix cells that correspond to the known significant feature. After the user demarcates the known significant feature to create a target region, computer 12 in step 24 places a logical "1" in each matrix cell within the target region and a logical "0" in each matrix cell outside the target region to generate a target dichotomy matrix. However, one of ordinary skill in the art will recognize that other symbols may be utilized or that the logical "1's" and "0's" may be reversed.

If the user selects the targetless approach in step 21 or computer 12 has completed the creation of a target dichotomy matrix in step 24, computer 12 in step 25 queries the user to input a k number of transform functions (1<= k<=16) to be applied to the data within each of the n matrices. Alternatively, computer 12 could include a predetermined number of transform functions for immediate application to the data in the n matrices. Computer 12 applies the transform functions only to the n matrices and not to the target dichotomy matrix. Although this preferred embodiment uses up to 16 transform functions, those skilled in the art will recognize that more than 16 transform functions may be employed. However, more than 16 transform functions provides little additional diversity in the representation of the data in exchange for the significantly larger amount of processing required and, therefore, is not particularly necessary.

In step 26, computer 12 applies the user selected or predetermined number of k transform functions to the data in each of the n matrices. In applying the k transform functions, computer 12 transforms the data in the n matrices into k number of different data representations with the data resulting from each transform function forming an nk number of transformation matrices stored in memory by computer 12. Similar to the n matrices, computer 12 stores each of the nk transformation matrices in its memory to begin, in the case of a single parameter, or maintain, for multiple parameters, the "spatial registry" that allows easy comparison of matrix cells during the determination of "attractors" in the data fields of the physical property or physical properties of the object.

Computer 12 transforms the data in the n matrices to achieve a sufficient diversity in the data that permits the development of a comprehensive description of the object utilizing the initial data fields of a physical property or set of physical properties of the object. Regardless of the number and type of transform functions chosen by the user, computer 12 applies the transform functions uniformly to the data within the n matrices.

In this preferred embodiment, computer 12 applies a "sliding window" technique to transform the data within each cell of the n matrices using the k transform functions to produce the nk transformation matrices. A "sliding window" is a smaller matrix placed within the n matrices and manipulated by computer 12 to control the application of a transform function to an individual cell. The "sliding window" matrix permits computer 12 to use data in surrounding cells in transforming data within an individual cell. Computer 12 utilizes the additional data to ensure an accurate result by providing sufficient input for the transform function. Consequently, the "sliding window" matrix must have a size that incorporates a sufficient number of cells to permit each particular transform function to produce transformed data that is statistically representative of the object. The "sliding window" matrix in this preferred embodiment may be any one of a 7×7, 9×9, 11×11 or 13×13 matrix.

Computer 12 begins the application of the transform functions by querying the user to select the size of the "sliding window" matrix from the group listed above. Computer 12 applies a transform function to each of the n matrices by sequentially centering the "sliding window" matrix on individual cells. Thus, a "sliding window" matrix in the preferred embodiment has an odd number of rows and columns to provide a center cell. After centering the "sliding window" matrix, computer 12 solves the transform function using the data from all the cells encompassed by the "sliding window" matrix. Once the transform function has been solved, computer 12 stores the result in a nk transformation matrix in a cell of the nk transformation matrix that corresponds to the centered cell of the n matrix being transformed. Computer 12 then moves the "sliding window" matrix and centers it on an adjacent cell to apply the transform function to that cell. Computer 12 continues until all of the n matrices have been transformed using each of the k transform functions to produce nk transformation matrices.

For the purposes of disclosure and to aid in the understanding of the preferred embodiment an illustrative 3 row by 3 column "sliding window" matrix will be described with reference to FIG. 2. To transform the data within cell $A_{2,2}$, the "sliding window" matrix is centered on cell $A_{2,2}$ so that cells $A_{1,1}$–$A_{3,3}$ are encompassed. Computer 12 solves the transform function using the data from cells $A_{1,1}$–$A_{3,3}$ and stores the result in cell $A_{2,2}$ of a nk transformation matrix. Computer 12 then re-centers the "sliding window" matrix on cell $A_{2,3}$ so that cells $A_{1,2}$–$A_{3,4}$ are encompassed. Computer 12 solves the transform function using the data from cells $A_{1,2}$–$A_{3,4}$ and stores the result in cell $A_{2,3}$ of the same nk transformation matrix. Although outer cells are utilized in the transformation of the data within other cells, they are not transformed in this preferred embodiment and are actually excluded from the transformation matrix because the "sliding window" matrix cannot be centered on outer cell, and a statistically representative result of a calculated transform function may only be achieved when calculated for the center cell of the "sliding window" matrix. However, one of ordinary skill in the art will recognize that techniques utilizing the outer cells exist and may be employed to transform the data within a matrix. Computer 12 repeats the above described procedure for each cell of matrix 15 until the nk transformation matrix is completed. Computer 12 further applies each of the k transform functions to matrix 15 and to all of the remaining n matrices to create the nk transformation matrices.

Possible transform functions include but are not limited to the following: (1) the difference between the entropy (Shennon's entropy) of the observed distribution and the entropy under the supposition that all entropy values occur with equal probability; (2) the maximum horizontal gradient; (3) the azimuthal direction of the maximum horizontal gradient; (4) the difference between the median of the values in the "sliding window" matrix and the median of all of the values in the matrix; and (5) Laplacian, Gaussian curvature, and mean curvature geometric characteristics. Although only the above transform functions have been described, those skilled in the art will recognize that any transform function that creates a diverse representation of the data may be utilized.

After applying the k transform functions to each of the n matrices to derive the nk transformation matrices, computer 12 in step 27 generates a base dichotomy from each of the nk transformation matrices to form nk base dichotomy matrices. Each cell of a base dichotomy matrix is marked with the characteristic associated with the transform function used to derive the transformation matrix now utilized by computer 12 to generate the base dichotomy matrix. Computer 12 develops the nk base dichotomy matrices by separating the data within each transformation matrix into two subsets comprised of equal numbers of matrix cells. Computer 12 separates the data of each transformation matrix into two subsets because that representation constitutes the most stable classification of the data and subsequently provides the user with the most natural and convenient form for characterizing the object in terms of useful and not useful parts.

Figure 5:
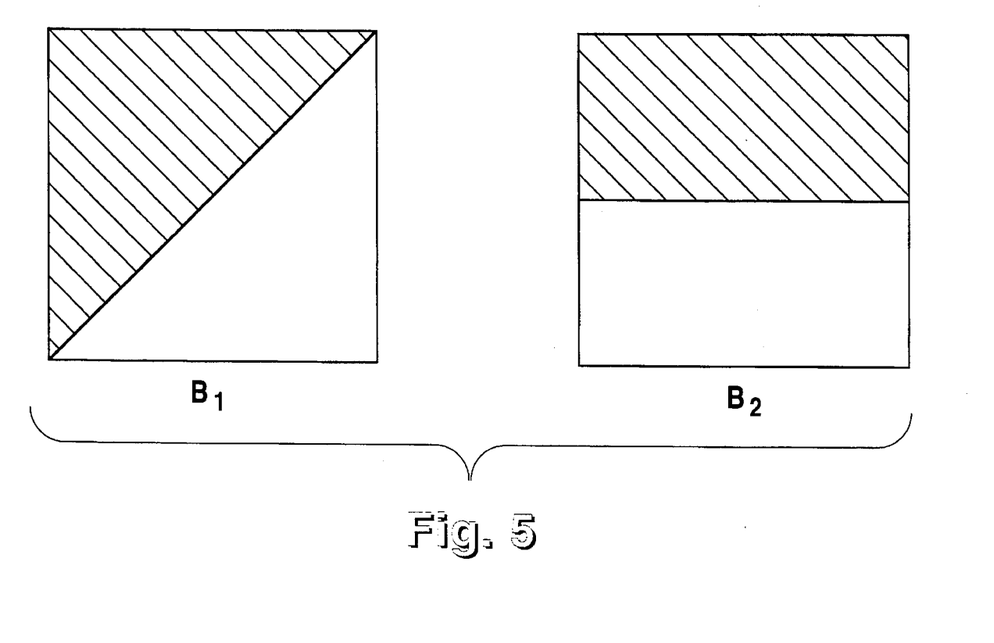
FIG. 5 illustrates hypothetical base dichotomy matrices.

Computer 12 develops a base dichotomy matrix by first determining the median value for a transformation matrix. After calculating the median value, computer 12 compares the median value to the value of the data within each individual cell of the nk transformation matrix. When the value of the data within an individual cell exceeds the median value, computer 12 stores a logical "1" in the base dichotomy matrix in a cell of the base dichotomy matrix that corresponds to the cell of the transformation matrix. Conversely, if the median value exceeds the value of the data within an individual cell, computer 12 stores a logical "0" in the base dichotomy matrix in a cell of the nk base dichotomy matrix that corresponds to the cell of the nk transformation matrix. If the value of the data within any individual cell equals the median value, computer 12 waits until the completion of all the comparisons before deciding whether the individual cell receives a logical "1" or a logical "0". At the completion of the comparisons, computer 12 divides remaining cells and randomly assigns logical "1's" and logical "0's". In the event there are an odd number of remaining cells, computer 12 randomly assigns a logical "1" or logical "0" to the odd cell. Computer 12 repeats the above procedure for each of the nk transformation matrices until it has formed each of the nk base dichotomy matrices. FIG. 5 illustrates matrices B1 and B2 that are matrices from a hypothetical set of nk base dichotomy matrices. The shaded region represents the logical "1's" and the unshaded region represents the logical "0's".

In each of the nk base dichotomy matrices, the cells assigned a logical "1" and the cells assigned a logical "0" form two non-overlapping subsets containing an equal number of uniform elements for each of the nk transformation matrices. However, those skilled in the art will recognize that the subsets may include a mild inequality between the number of logical "1's" and logical "0's" of the subsets without impairing the determination of the "attractors" in the data fields of the physical property or set of physical properties of the physical system. Additionally, computer 12 stores each of the nk base dichotomy matrices in its memory to maintain the "spatial registry" that permits easy comparison of the individual matrix cells during the determination of "attractors". Although this preferred embodiment uses the median in forming the nk base dichotomy matrices because it is the most effective, those skilled in the art will recognize that many other methods may be utilized.

If the user selected the targetless approach in step 21, computer 12 now proceeds to step 28 and queries whether the user desires to decide which of the nk base dichotomy matrices are the most distinct and, therefore, will be utilized in determining the "attractors" in the data fields of the physical property or the set of physical properties of the object. The nk base dichotomy matrices are limited to the most distinct for the purpose of optimizing the subsequent determination of the "attractors". However, the number of base dichotomy matrices must not be too limited or an under-representation of the data fields of the physical property or set of physical properties of the object results which produces an inaccurate determination of "attractors". In this preferred embodiment, the number of base dichotomy matrices is limited to 9–16 matrices. However, although 9–16 matrices is optimal, those skilled in the art will recognize that less than 9 and more than 16 will also permit the determination of the "attractors".

If the user desires to select the most distinct base dichotomy matrices, computer 12 in step 29 displays each of the nk base dichotomy matrices on display 13 and, if desired, prints each of the nk base dichotomy matrices using printer/plotter 14 (see FIG. 1). The user then examines each of the nk base dichotomy matrices to decide which 9–16 are the most distinct. After determining the 9–16 most distinct base dichotomy matrices, the user employs an input device such as a keyboard to inform computer 12 of the 9–16 most distinct matrices selected. After receiving the selected 9–16 most distinct matrices from the user, computer 12 proceeds to step 34 and utilizes the selected 9–16 most distinct matrices in forming the full description set.

Figure 4A:
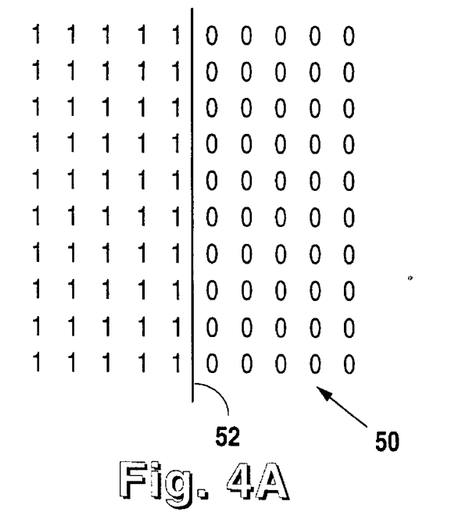
FIGS. 4A–C illustrate hypothetical base dichotomy matrices and the boundary lines utilized in determining a degree of compactness.
Figure 4B:
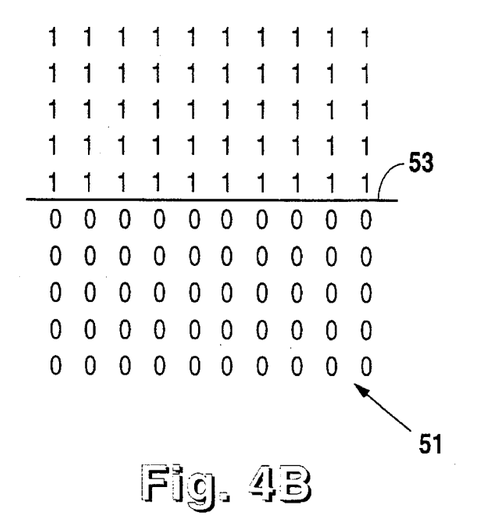
Figure 4C:
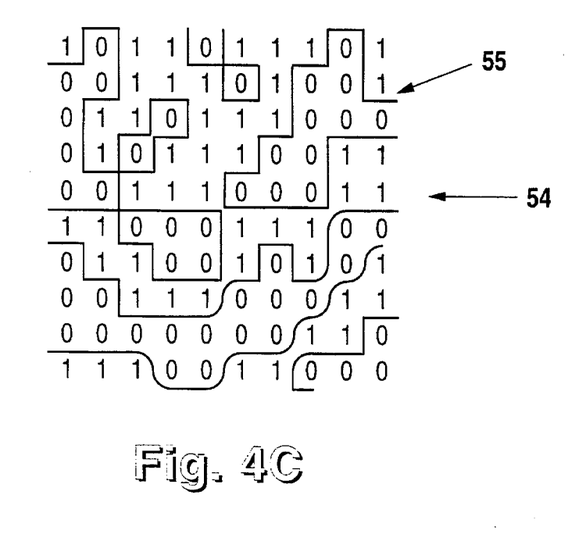

Alternatively, if the user selects computer 12 to determine the 9–16 most distinct base dichotomy matrices, computer 12 in step 30 determines the degree of compactness for each of the nk base dichotomy matrices. Computer 12 determines the degree of compactness for each of the nk base dichotomy matrices by developing an aggregate length for a boundary line that separates the logical "1's" from the logical "0's". However, one of ordinary skill in the art will recognize that other techniques to determine degree of compactness may be used. FIGS. 4A and B illustrate matrices 50 and 51 that have a maximum degree of compactness. FIG. 4C illustrates matrix 54 that has a lesser degree of compactness than matrices 50 and 51 because the logical "1's" and "0's" are more randomly distributed. Thus, boundary line 55 must wind about the logical "1's" and "0's" to separate them and has a length greater than boundary lines 52 and 53. A matrix having a minimal degree of compactness has alternating logical "1's" and "0's" among its cells.

Computer 12 develops a boundary line for each of the nk base dichotomy matrices and measures its aggregate length using any one of several well known methods. Illustratively, computer 12 sequentially traverses the individual matrix cells along the columns and then the rows of an nk base dichotomy matrix and increases a boundary line length count by one each time it detects a change between adjacent matrix cells from either a logical "0" to a logical "1" or a logical "1" to a logical "0". The resulting boundary line length count is the aggregate length of the boundary line and, therefore, reflects the degree of compactness of the nk base dichotomy matrix.

After determining the degree of compactness, computer 12 orders the nk base dichotomy matrices from the most compact to the least compact. That is, computer 12 arranges the nk base matrices in its memory from the most compact (i.e., the matrix having the shortest aggregate boundary line) to the least compact (i.e., the matrix having the longest aggregate boundary line).

Once computer 12 has ordered the nk base dichotomy matrices, it in step 31 pairwise compares each base dichotomy matrix with each remaining base dichotomy matrix to assess the degree of similarity between each pair of base dichotomy matrices by developing a degree of similarity number. To produce a degree of similarity number for a first and second pair of base dichotomy matrices, computer 12 first creates a logical number pair matrix for that pair of base dichotomy matrices. Computer 12 creates the logical number pair matrix by comparing the individual cells of the first base dichotomy matrix with each corresponding individual cell of the second base dichotomy matrix to determine the resulting logical number pairs ("00", "01", "10", and "11") for each pair of matrix cells. Computer 12 then places the resulting logical number pairs in matrix cells of the logical number pair matrix that correspond to the matrix cells of the first and second base dichotomy matrices.

Illustratively, matrix cell $A_{1,1}$ of the first base dichotomy matrix would be compared with matrix cell $A_{1,1}$ of the second base dichotomy matrix. If matrix cell $A_{1,1}$ of the first base dichotomy matrix included a logical "0", the resulting logical number pair would be either "00" or "01" depending upon the logical number within matrix cell $A_{1,1}$ of the second base dichotomy matrix. Similarly, if matrix cell $A_{1,1}$ of the first base dichotomy matrix included a logical "1", the resulting logical number pair would be either "10" or "11" depending upon the logical number within matrix cell $A_{1,1}$ of the second base dichotomy matrix. Regardless of the resulting logical number pair, computer 12 would place that logical number pair in matrix cell $A_{1,1}$ of the resulting logical number pair matrix.

After developing the logical number pair matrix for the first and second base dichotomy matrices, computer 12 counts the frequency of occurrence for each logical number pair within the logical number pair matrix and divides those frequencies of occurrence by the total number of matrix cells in the logical number pair matrix. The resulting numbers reflect the proportions of each logical number pair within the logical number pair matrix. Computer 12 develops the degree of similarity number for the first and second base dichotomy matrices by adding the proportion numbers for the logical number pairs "00" and "11" together and the proportion numbers for the logical number pairs "01" and "10" together and selecting the greater sum as the degree of similarity number. Illustratively, if the sum of the logical number pairs "00" and "11" is 0.2 while the sum of the logical number pairs "01" and "10" is 0.8, computer 12 selects 0.8 as the degree of similarity number. Similarly, if the sum of the logical number pairs "01" and "10" is 1.0 while the sum of the logical number pairs "00" and "11" is 0.0, computer 12 selects 1.0 as the degree of similarity number. When the sum of the logical number pairs "00" and "11" and the sum of the logical number pairs "01" and "10"

both equal 0.5, computer 12 merely utilizes 0.5 as the degree of similarity number. Computer 12 repeats the above-described procedure until it develops a degree of similarity number for each pair of base dichotomy matrices of the ordered base dichotomy matrices.

Once computer 12 develops the degree of similarity numbers, it queries the user in step 32 to input a threshold degree of similarity number ranging from 0.5 to 1.0. After receiving the threshold degree of similarity number, computer 12 in step 33 selects the 9–16 most distinct base dichotomy matrices. Computer 12 begins by attempting to organize the base dichotomy matrices into 9–16 clusters of matrices in accordance with the value of the input threshold degree of similarity number. Computer 12 begins by placing any base dichotomy matrix that does not have a degree of similarity number with any other matrix above the threshold value in its own cluster. Computer 12 then places the base dichotomy matrices having a degree of similarity number with another base dichotomy matrix above the threshold value in clusters arranged such that all the base dichotomy matrices in any one cluster have a degree of similarity number above the threshold value with every other base dichotomy matrix in that cluster.

Illustratively, a first base dichotomy matrix having a degree of similarity number greater than the threshold value with both a second and third base dichotomy will form a cluster with the second and third base dichotomies provided that the second base dichotomy matrix has a degree of similarity number with the third base dichotomy matrix greater than the threshold value. If the second and third base dichotomy matrices have a degree of similarity number less than the threshold value, the first base dichotomy forms a separate cluster with each of the second and third base dichotomy matrices.

If computer 12 is unable to form 9–16 clusters that include each base dichotomy matrix and, instead, forms less than 9 clusters, it informs the user the threshold value is too low and queries the user to input a new threshold value. Conversely, if computer 12 is forms more than 16 clusters, it informs the user the threshold value is too high and queries the user to input a new threshold value.

Once computer 12 receives a threshold value that results in the formation of 9–16 clusters of base dichotomy matrices, it must select the most representative base dichotomy matrix from each of the 9–16 clusters. Any cluster including only a single base dichotomy matrix as described above immediately becomes one of the 9–16 most distinct base dichotomy matrices and does not undergo the following steps. To determine the most representative base dichotomy matrix of any cluster, computer 12 creates a matrix using the degree of similarity numbers developed between each of the base dichotomy matrices of the cluster (see FIG. 6). Each base dichotomy matrix of the cluster is placed on a row and column of the matrix, and the corresponding degree of similarity numbers are placed in the matrix in accordance with the position of the particular base dichotomy matrices. Illustratively, matrix $M_1$ is placed on row1 and column1, while matrix $M_3$ is placed on row3 and column 3 so their degree of similarity number of 0.9 is positioned in row1, column3 and row3,column1. Rows and columns that have the same base dichotomy matrix receive a degree of similarity number of 1.0.

Figure 6:
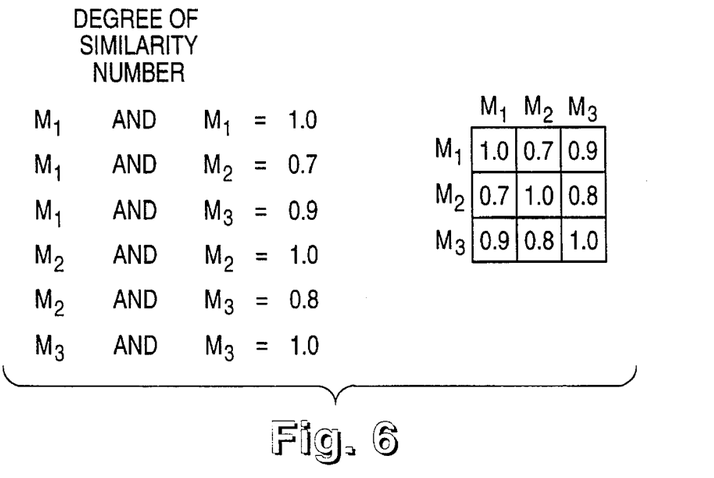
FIG. 6 illustrates the determination of the most representative matrix in a cluster of matrices.

After forming the degree of similarity number matrix, computer 12 calculates the total ,determinant for the degree of similarity number matrix. Computer 12 then removes the first row and column of the degree of similarity number matrix and calculates a partial determinant without that row and column. Similarly, computer 12 replaces the first row and column, removes the second row and column, and calculates a partial determinant without the second row and column. Computer 12 sequentially replaces and removes the rows and columns and calculates a partial determinant until the last row and column has been removed. Once all the partial determinants have been calculated, computer 12 compares the partial determinants to the total determinant to determine which partial determinant has a value nearest to the total determinant. The base dichotomy matrix forming the row and column that when removed produced the partial determinant nearest in value to the total determinant is the most representative base dichotomy matrix of the cluster.

Computer 12 performs the above-procedure for each cluster until the 9–16 most distinct base dichotomy matrices have been selected. Computer 12 then lists the 9–16 most distinct base dichotomy matrices in its memory from the most compact to the least compact using the method of determining compactness as previously described. Although computer 12 has been described as selecting the most representative base dichotomy matrix from a cluster, those skilled in the art will recognize that computer 12 could display or print the clusters so that the user could make the selection of the most representative base dichotomy matrix from each cluster.

In step 34, computer 12 utilizes the selected 9–16 most distinct base dichotomy matrices to develop the full description set of matrices. Computer 12 begins by creating a companion matrix for each of the 9–16 most distinct base dichotomy matrices. The companion matrices consist of the inverse for each of the 9–16 most distinct base dichotomy matrices. Computer 12 develops the companion matrices to eliminate a comparison between matrix cells using a logical "0" when determining internesting (described herein).

Figure 7:
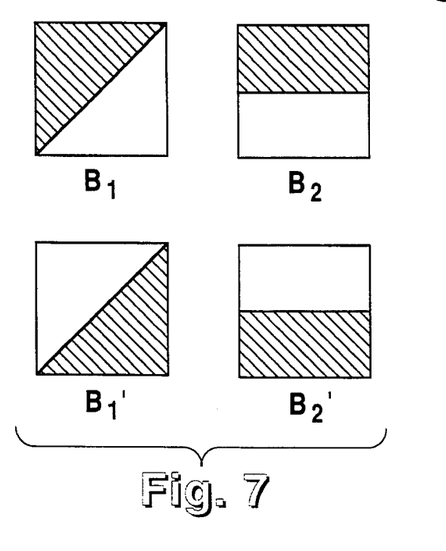
FIG. 7 illustrates, the hypothetical base dichotomy matrices of FIG. 5 and their companion matrices.

To form a companion matrix, computer 12 substitutes a logical "0" in the cells of a most distinct base dichotomy matrix containing a logical "1" and a logical "1" in the cells containing a logical "0". Computer 12 performs the above procedure for each matrix of the 9–16 most distinct base dichotomy matrices to produce a complete set of companion matrices. After developing the companion matrices, computer 12 stores in its memory each most distinct base dichotomy matrix with its companion matrix directly adjacent to form a base level of matrices. Additionally, computer 12 maintains the "spatial registry" among corresponding matrix cells and orders the base level matrices from the most compact to the least compact. FIG. 7 illustrates matrices B1 and B2 of FIG. 5 and their companion matrices B1' and B2'.

After forming the base level of matrices, computer 12 develops a full description set of matrices utilizing the matrices from the base level. Computer 12 develops the full description set by sequentially intersecting higher numbers of matrices from the base level to build intersection levels of matrices. Computer 12 begins by intersecting the base level matrices in pairs to form a second level of intersection. Specifically, computer 12 intersects each base level matrix with the remaining base level matrices to form pair intersection matrices until each base level matrix has been intersected with all other base level matrices.

Computer 12 generates a pair intersection matrix by logically "AND'ing" each individual cell in a first base level matrix with each corresponding individual cell of a second base level matrix. Each matrix cell of the resulting pair intersection matrix will have a value of logical "0" unless both corresponding matrix cells of the first and second base level matrices include values of logical "1". Illustratively, matrix cell $A_{1,1}$ of the first base level matrix would be logically "AND'ed" with matrix cell $A_{1,1}$ of the second base level matrix to determine the value placed in matrix cell $A_{1,1}$ of the resulting pair intersection matrix. That value will be a logical "0" unless matrix cell $A_{1,1}$ of both the first and second base level matrices contains a logical "1".

Figure 8:
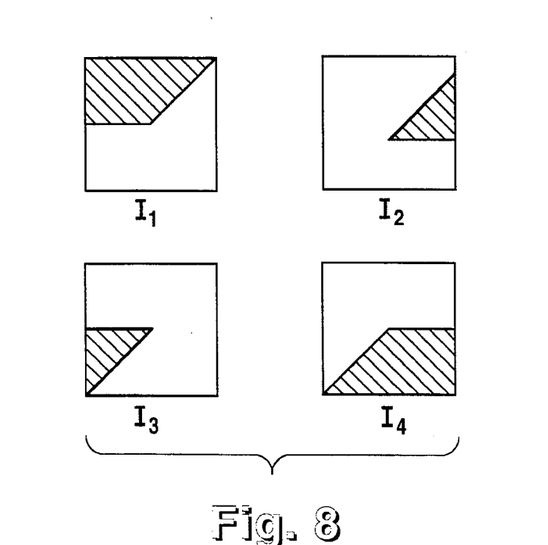
FIG. 8 illustrates intersection matrices formed through the intersection of the hypothetical base dichotomy matrices of FIG. 5 and their companion matrices.

FIG. 8 illustrates matrices I1, I2, I3, and I4 that are matrices resulting from intersections among matrices B1 and B2 and their companion matrices B1' and B2'. Matrix I1 results from the intersection of matrices B1 and B2. Matrix I2 results from the intersection of matrices B1' and B2. Matrix I3 results from the intersection of matrices B1 and B2'. Matrix I4 results from the intersection of matrices B1' and B2'.

Computer 12 then intersects the base level matrices in triples to form a third level of intersection. Computer 12 intersects combinations of three base level matrices to form triple intersection matrices until all possible combinations of three base level matrices have been intersected. Next, computer 12 intersects the base level matrices in quadruples to form a fourth level of intersection. Computer 12 intersects combinations of four base level matrices to form quadruple intersection matrices until all possible combinations of four base level matrices have been intersected. Computer 12 sequentially intersects higher numbers of base level matrices until it intersects all the base level matrices together to form the highest level intersection. Computer 12 stores each intersection level of matrices in its memory including the base level of matrices to form the full description set which is then utilized in determining "attractors" in the data fields of a physical property or set of physical properties of the object.

As a result of the intersections described above, each matrix in the full description set created through the intersection of base level dichotomy matrices inherits the characteristics of those base dichotomy matrix. Consequently, the full description set has a hierarchical structure where the base (first) level dichotomy matrices include one characteristic, the second level intersection matrices include two characteristics, the third level intersection matrices include three characteristics, the fourth level intersection matrices include four characteristics, and up to the highest level of intersection matrix which includes characteristics from each of the base level dichotomy matrices.

In step 35, computer 12 determines the "attractors" in the data fields of a physical property or set of physical properties of the object by establishing the roots of the full description set and ordering the roots in sequences that represent "attractors". A root is a subset of logical "1's" within a matrix of the full description set which is identified utilizing the procedure described herein. Furthermore, because roots are determined using the full description set of matrices, each root contains the characteristics of all base level dichotomy matrices utilized to form the matrix of the full description set containing the root.

Computer 12 begins by querying the user to input an internesting threshold value which varies between over 0.5 to 1.0. Computer 12 then designates the most compact matrix from the base level and the companion of that matrix and determines if the designated matrix or a higher level intersection matrix contains a root. Computer 12 locates a root by first determining if the subset of logical "1's" for any matrix in the second level of intersections internests in the subset of logical "1's" for either the designated matrix or its companion matrix. Computer 12 determines internesting by comparing the individual cells containing the logical "1's" for each second level intersection matrix with their corresponding individual cell containing the logical "1's" for the designated matrix and then with their corresponding individual cell containing the logical "1's" for the companion matrix. Internesting of the subset of logical "1's" for a second level intersection matrix in the subset of logical "1's" for the designated matrix occurs when the proportion of logical "1's" in the second level intersection matrix that coincide with logical "1's" in the designated matrix equals or exceeds the internesting threshold value. Similarly, internesting of the subset of logical "1's" for a second level intersection matrix in the subset of logical "1's" for the companion matrix occurs when the proportion of logical "1's" in the second level intersection matrix that coincide with logical "1's" in the designated matrix equals or exceeds the internesting threshold value.

When no second level intersection matrix includes a subset of logical "1's" that internests in the subset of logical "1's" for either the designated matrix or its companion matrix, the designated matrix contains a root (i.e., the subset of logical "1's") utilized by computer 12 in building sequences of roots. If one second level intersection matrix contains a subset of logical "1s" that internests in the subset of logical "1's" for either the designated matrix or its companion matrix, the subset of logical "1's" for the internested second level intersection matrix becomes an unverified root that must be tested to determine if it is an actual root (described herein). Alternatively, if more than one second level intersection matrix (i.e., a group) contains a subset of logical "1's" that internest in the subset of logical "1's" for either the designated matrix or its companion matrix, computer 12 searches for a subset of logical "1's" in a second level intersection matrix of the group into which all of the remaining subsets of logical "1's" for the second level intersection matrices of the group internest. When no such subset of logical "1's" exists, the designated matrix contains a root utilized by computer 12 in building sequences of roots. However, if a subset of logical "1's" for a second level intersection matrix of the group exists into which all of the remaining subsets of logical "1's" for the second level intersection matrices of the group internest, that subset of logical "1's" becomes an unverified root that must be tested to determine if it is an actual root (described herein).

Computer 12 determines if an unverified root from the second level is the actual root by determining if any subset of logical "1's" for a matrix in the third level of intersections internests in the unverified root. When none of the subsets of logical "1's" for the third level intersection matrices internests in the unverified root, the unverified root is verified and, therefore, becomes a root utilized by computer 12 in building sequences of root. If only one subset of logical "1's" for the third level intersection matrices internests in the unverified root, the internested subset of logical "1's" for the third level intersection matrix becomes an unverified root that must be tested to determine if it is an actual root. Alternatively, if more than one subset of logical "1's" for the third level intersection matrices (i.e., a group) internests in the unverified root, computer 12 searches for a subset of logical "1's" for the third level intersection matrices of the group into which all of the remaining subsets of logical "1's" for the third level intersection matrices of the group internest. When no such subset of logical "1's" exists, the unverified root is verified and, therefore, becomes a root utilized by computer 12 in building sequences of roots. However, if a subset of logical. "1's" for the third level intersection matrices of the group exists into which all of the remaining subsets of logical "1's" of the third level intersection matrices of the group internest, that subset of logical "1's" becomes an unverified root that must be tested to determine if it is an actual root.

Computer 12 ascertains if an unverified root from the third level is the actual root by determining if any subset of logical "1's" for the matrices in the fourth level of intersection internests in the unverified root. Computer 12 utilizes the procedure described above and either verifies the third level unverified root or establishes a subset of logical "1's" for the fourth level intersection matrices as an unverified root. Computer 12 sequentially checks subsets of logical "1's" for higher levels of intersection matrices for any designated matrix and it companion until a root is found.

Once computer 12 establishes a root for a designated matrix and its companion, it designates the next most compact matrix and its companion from the base level for determination of a root. Computer 12 performs the above-described procedure for locating a root for each matrix of the base level and its companion matrix in a descending order of compactness until a root has been located for the least compact base level matrix and its companion.

Figure 9:
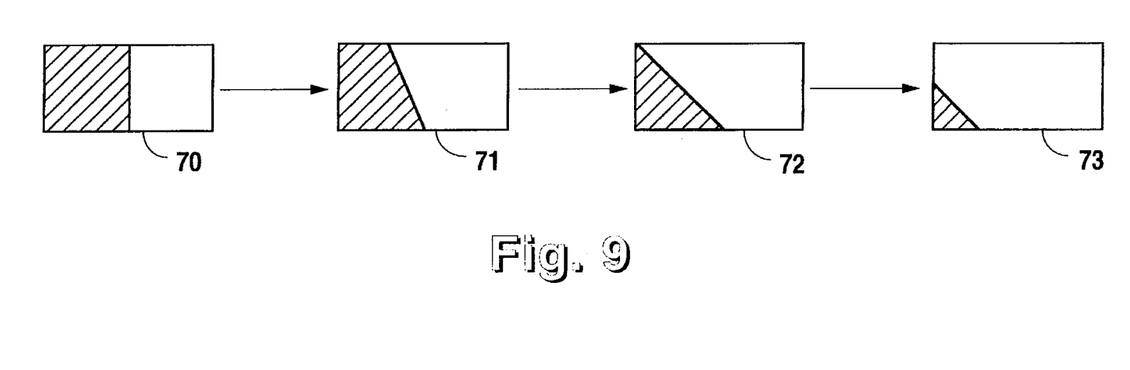
FIG. 9 illustrates a hypothetical root sequence.

After determining the roots for each base level matrix and its companion, computer 12 in step 36 organizes the roots into sequences because the sequences of roots are the "attractors" in the data fields of a physical property or set of physical properties of the object. Computer 12 forms a sequence of roots by sequentially arranging rows of roots that internest (see FIG. 9). Computer 12 begins by locating a root 70 selected from a lowest possible level (e.g., the base level) because roots at the lowest possible level contain a minimal number of intersecting characteristics. Second, computer 12 determines a next higher level root 71 that contains the intersecting characteristics of root 70 and, therefore, internests into root 70. Third, computer 12 locates a next higher level root 72 that contains the intersecting characteristics of both roots 70 and 71 and, therefore, internests into root 71. Fourth, computer 12 locates a next higher level root 73 that contains the intersecting characteristics of roots 70, 71 and 72 and, therefore, internests into root 72. Computer 12 builds the sequence until it does not find a higher level root that contains the intersecting characteristics of all the prior roots in the sequence. Computer 12 then selects a new lowest level root and repeats the above procedure to build another sequence. Computer 12 repeats the root sequence building process until all roots have been placed in a sequence and all possible root sequences have been established.

After building the root sequences, computer 12 in step 37 displays the root sequences on display 13 as "attractor" representations of the initial observed data fields. Furthermore, computer 12 prints the root sequences using printer/plotter 14. The establishing of "root-attractors" is extremely useful because the "root-attractors" in the observed data fields are the reflections of the "attractors" in the object that formed the observed data fields. Because "root-attractors" are not oriented towards any specific significant features within the object, they reflect the most fundamental properties of the object and, therefore, most of the significant features within the object, if any exist, have the highest probability of being associated with the "root-attractors".

Upon the completion of step 27 in which computer 12 develops the nk base dichotomy matrices, computer 12 will proceed to step 38 if the user selected the target oriented approach in step 21. In step 38, computer 12 utilizes the target dichotomy matrix generated in step 23 to select 9–16 base dichotomy matrices that will be utilized in determining the "attractors" in the data fields of a physical property or set of physical properties in the object. Computer 12 selects the 9–16 base dichotomy matrices by determining which base dichotomy matrices include a subset (i.e., either logical "1's" or logical "0's") that overlaps the target region (i.e., the subset of logical "1's") by a threshold overlap number. Accordingly, computer 12 begins by querying the user to input a value for the threshold degree of overlap number which, in this preferred embodiment varies from greater than 0.5 to 1.0.

Upon receiving the threshold degree of overlap number, computer 12 sequentially overlays the target dichotomy matrix and each base dichotomy matrix to determine the degree of overlap between the target region and a subset of each base dichotomy matrix. To produce a degree of overlap number for a base dichotomy matrix, computer 12 counts the number of cells in the target region that overlap the logical "1's" subset of the base dichotomy matrix and the number of cells in the target region that overlap the logical "0's" subset of the base dichotomy matrix. Computer 12 then divides the number of cells that overlap the logical "1's" subset of the base dichotomy by the total number of cells in the target region to calculate a "1's" overlap number. Similarly, computer 12 divides the number of cells that overlap the logical "0's" subset of the base dichotomy by the total number of cells in the target region to calculate a "0's" overlap number. If either the "1's" overlap number or the "0's" overlap number equals or exceeds the threshold degree of overlap value input by the user, computer 12 designates the base dichotomy matrix as one of the 9–16 base dichotomy matrices. However, when the "0's" overlap number exceeds the threshold degree of overlap value, computer 12 inverts the base dichotomy matrix to form its companion matrix so that the region of overlap with the target region will be represented by logical "1's".

Computer 12 repeats the above-described procedure until it develops a degree of overlap number for each base dichotomy matrix and selects the 9–16 base dichotomy matrices. If computer 12 is unable to select 9–16 base dichotomy matrices and, instead, selects less than 9 base dichotomy matrices, it informs the user the threshold degree of overlap value is too high and queries the user to input a new threshold value. Conversely, if computer 12 selects more than 16 base dichotomy matrices, it informs the user the threshold degree of overlap value is too low and queries the user to input a new threshold value. Computer 12 continuously queries the user for a threshold degree of overlap value and performs the above-described procedure until it receives a threshold value that results in 9–16 base dichotomy matrices being selected.

After selecting 9–16 base dichotomy matrices, computer 12 in step 39 develops a full description set of matrices utilizing the selected base dichotomy matrices. Computer 12 develops the full description set by first sequentially intersecting higher numbers of matrices from the selected base dichotomy matrices to build intersection levels of matrices using the procedure described above with reference to the targetless approach. Computer 12 then tests each intersection matrix to determine if it has a sufficient degree of overlap and measure of similarity with the target dichotomy matrix to become a member of the full description set (described herein). Intersection matrices that do not satisfy both of the above conditions are discarded and do not become part of the full description set.

After computer 12 sequentially intersects the higher numbers of selected base dichotomy matrices, it queries the user to input a threshold degree of overlap number that, in this preferred embodiment varies from over 0.5 to 1.0 and a threshold measure of similarity number that, in this preferred embodiment varies from 0.0 to 1.0. Computer 12 then determines which of the intersection matrices belong in the full description set of matrices and which should be discarded. Computer 12 begins by determining the degree of overlap with the target dichotomy matrix for all intersection matrices as previously described. If an intersection matrix has a degree of overlap number equal to or greater than the threshold degree of overlap number input by the user, computer 12 saves that intersection matrix for testing to determine if its measure of similarity with the target dichotomy matrix is above the threshold measure of similarity value, otherwise the intersection matrix is discarded.

Computer 12 develops a value (C) representing the measure of similarity between a remaining intersection matrix and the target dichotomy matrix using the formula $C=H(x,y)-H(y)$ where H is Shennon's entropy. $H(x,y)$ is the entropy of the joint distribution of logical number pairs (i.e., 00, 01, 10, 11) in the remaining intersection matrix and the target dichotomy matrix. $H(y)$ is the entropy of the distribution of logical "1's" and logical "0's" in the target dichotomy matrix.

Computer 12 develops $H(x,y)$ for a remaining intersection matrix by determining the negative summation of the probability of each logical number pair ($P_{00-11}$) times the logarithm of the probability of each logical number pair ($P_{00-11}$) which in formula form appears as $-(P_{00}*\log P_{00}+P_{01}*\log P_{01}+P_{10}*\log P_{10}+P_{11}*\log P_{11})$. Computer 12 calculates $H(x,y)$ by first determining the logical number pairs for the target dichotomy matrix and the remaining intersection matrix. Computer 12 overlays the target dichotomy matrix on the remaining intersection matrix and determines the resulting logical number pair for each matrix cell. Computer 12 counts the numbers of each logical number pair and then divides each of those four numbers by the total number of logical number pairs to calculate a probability of each logical number pair. Computer 12 then substitutes each of the four probabilities of logical number pairs into the above formula to determine $H(x,y)$.

Computer 12 develops $H(y)$ for the target dichotomy matrix by determining the negative summation of the probability of logical "0's" and logical "1's" ($P_{0\ and\ P1}$) times the logarithm of the probability of logical "0's" and logical "1's" ($P_{0\ and\ 1}$) which in formula form appears as $-(P_0*\log P_0+P_1*\log P_1)$. To calculate $H(y)$, computer 12 counts the number of logical "0's" and logical "1's" of the target dichotomy matrix and then divides those two numbers by the total number of cells in the target dichotomy matrix. Computer 12 then substitutes each of the two probabilities into the above formula to determine $H(y)$.

Once computer 12 determines $H(x,y)$ and $H(y)$, it subtracts $H(y)$ from $H(x,y)$ to ascertain the measure of similarity number (C) for the remaining intersection matrix. Computer 12 sequentially calculates a measure of similarity number (C) for each of the remaining intersection matrices using the procedure described above.

After calculating each measure of similarity number (C), computer 12 compares each calculated measure of similarity number (C) to the threshold measure of similarity number to determine the matrices of the remaining intersection matrices that belong in the full description set. If a remaining intersection matrix has a measure of similarity number equal to or greater than the threshold measure of similarity number input by the user, computer 12 places that remaining intersection matrix in the full description set of matrices, otherwise the remaining intersection matrix is discarded.

After ascertaining which intersection matrices belong in the full description set of matrices, computer 12 stores in its memory each selected base dichotomy matrix at a base level of a hierarchical arrangement and the intersection matrices belonging in the full description set hierarchically arranged above the base level according to their level of intersection. Computer 12 in step 40 then determines the "attractors" in the data fields of a physical property or set of physical properties of the object utilizing the matrices of the full description set. Computer 12 determines the "attractors" in the data fields of a physical property or set of physical properties of the object by establishing the branches of the full description set.

Computer 12 begins by designating a matrix from the highest level of intersection in the full description set that is the most similar number to the target dichotomy matrix. Computer 12 selects the most similar matrix for designation using the measure of similarity numbers calculated for all the matrices as previously described. Computer 12 checks for branches by first determining if the subset of logical "1's" for the designated matrix internests in any subset of logical "1's" for a matrix of the level of intersection below the highest level of intersection. Computer 12 determines internesting using the procedure described above with reference to the targetless approach.

If the subset of logical "1's" for the designated matrix internests in a subset of logical "1's" for one matrix in the level of intersection below the highest level of intersection, the subset of logical "1's" for the matrix in the level of intersection below the highest level of intersection becomes a member in a branch including the subset of logical "1's" for the designated matrix. However, if the subset of logical "1's" for the designated matrix internests in more than one subset of logical "1's" for matrix in the level of intersection below the highest level of intersection (i.e., a group), computer 12 selects the matrix from the group that is the most similar to the target dichotomy matrix and incorporates the subset of logical "1's" from the selected matrix in the branch including the subset of logical "1's" for the designated matrix. Computer 12 selects the most similar matrix using the measure of similarity numbers calculated for all the matrices as previously described.

When computer 12 fails to find a branch member in the level of intersection immediately below the highest level of intersection, it proceeds to the next lower level of intersection and checks for a subset of logical "1's" for inclusion in the branch utilizing the same designated matrix and procedure described above. However, if computer 12 locates a branch member in the level of intersection below the highest level of intersection, computer 12 substitutes the matrix of the branch member for the designated matrix so that the matrix of the branch member becomes the designated matrix. Computer 12 then checks for a branch member in the next lower level of intersection using the new designated matrix and the procedure described above.

Similarly, when computer 12 fails to find a branch member in the next lower level of intersection, it proceeds to a still lower level of intersection and checks for branch member utilizing the same designated matrix and the procedure described above. However, if computer 12 locates a branch member in the next lower level of intersection, computer 12 substitutes the matrix of the branch member for the designated matrix so that the matrix of the branch member becomes the designated matrix. Computer 12 then checks for a branch member in a still lower level of intersection using the new designated matrix and the procedure described above. Accordingly, computer 12 sequentially checks for branch members for the originally designated matrix until it has checked for a branch member in the base level of matrices, which consists of the selected base dichotomy matrices.

Once computer 12 has established the branch members for the matrix in the highest level most similar to the target dichotomy matrix, it establishes the branch members for the matrix in the highest level the second most similar to the target dichotomy matrix using the method described above. Computer 12 sequentially checks for branch members of the matrices in the highest level of intersection until all matrices in the highest level have been exhausted.

When computer 12 finishes with the highest level of intersection, it proceeds to the next lower level of intersection and designates the matrix most similar to the target dichotomy matrix. Computer 12 then establishes the branch members for the designated matrix as previously described. Computer 12 sequentially checks for branch members of the matrices in the next lower level of intersection until all matrices in the next lower level have been exhausted. Computer 12 sequentially checks for branch members of each matrix in subsequent lower levels of intersection until all matrices in the second level (i.e., the level of intersection above the base level) have been exhausted.

Figure 10:
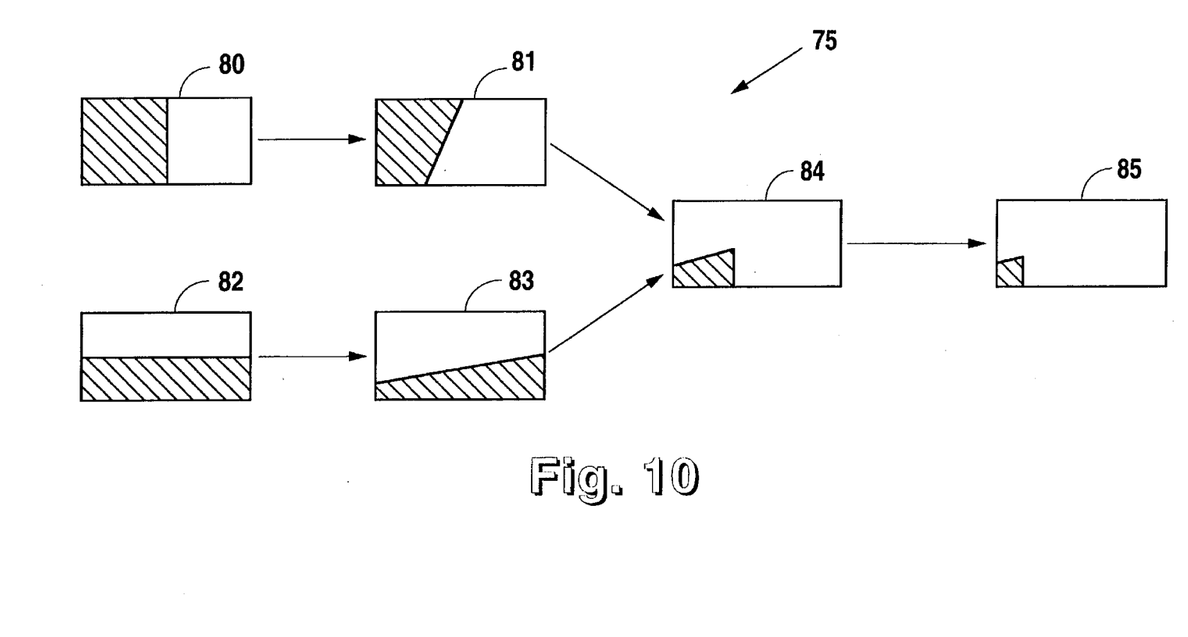
FIG. 10 illustrates a hypothetical branch.

After determining the branch members for each level of intersection matrices down to the second level, computer 12 in step 41 displays the branches on display 13 as "attractor" representations of the initial observed data fields. Furthermore, computer 12 prints the branches using printer/plotter 14. FIG. 10 illustrates an example branch 75 that includes branch members 80 and 82 which are from a low level (e.g., the base level). Consequently, branch members 80 and 82 contain a minimal number of intersecting characteristics and do not internest. Branch 75 includes branch member 81 which contains the intersecting characteristics of branch member 80 and branch member 83 which contains the intersecting characteristics of branch member 82. Branch member 81 internests into branch member 80, while branch member 83 internests into branch member 82, however, branch members 81 and 83 do not internest in each other. Branch 75 includes branch member 84 which contains the intersecting characteristics of branch members 80–83 and, therefore, internests into each one. Similarly, branch 75 includes branch member 85 which contains the intersecting characteristics of branch members 80–84 and, therefore, internests into each one.

The establishing of "branch-attractors" is extremely useful because the "branch-attractors" in the observed data fields are the reflections of the "attractors" in the object that formed the observed data fields. Because "branch-attractors" are oriented towards target specific significant features within the object, they reflect target specific properties of the object and, therefore, any target specific significant features within the object, if any exists, have the highest probability of being associated with the "branch-attractors". Based on the characteristics of "root-attractors" and "branch-attractors", it follows that spatially correlating the two types of "attractors" yields the most favorable zones for discovering target specific significant features of the object if any exist.

Although the present invention has been described in terms of the foregoing embodiment., such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. A method for analyzing object to determine a zone within the object exhibiting a highest level of structural organization, comprising the steps of:

measuring a physical property of the object at a plurality of different locations to construct a data field; digitizing the data within the data field;

arranging the data within the data field into a matrix;

transforming the data within the matrix to develop transformation matrices;

developing a base dichotomy matrix from each transformation matrix;

developing a full description set of matrices from the base dichotomy matrices;

selecting the roots of the full description set of matrices;

organizing the roots into sequences; and displaying the root sequences to provide a representation of a zone within the object exhibiting a highest level of structural organization.

2. The method according to claim 1 wherein the steps of measuring and digitizing comprise measuring physical properties of the object at a plurality of different locations to construct data fields and digitizing the data within the data fields.

3. The method according to claim 2 wherein the step of arranging comprises arranging the data of each data field into a matrix.

4. The method according to claim 3 wherein the step of transforming comprises applying at least one transform function to the data within each matrix to develop transformation matrices.

5. The method according to claim 1 wherein the step of transforming comprises applying a plurality of transform functions to the data within the matrix to develop transformation matrices.

6. The method according to claim 1 wherein the step of developing a base dichotomy matrix from each transformation matrix, comprises the steps of:

calculating a median value for a transformation matrix;

assigning a logical "0" to any transformed data within the transformation matrix less than the median value;

assigning a logical "1" to any transformed data within the transformation matrix greater than the median value;

randomly assigning logical "1's" and logical "0's" to any transformed data within the transformation matrix equaling the median value; and repeating the above steps for each transformation matrix.

7. The method according to claim 1 wherein the step of developing a full description set of matrices from the base dichotomy matrices, comprises the steps of:

selecting the most distinct base dichotomy matrices;

developing a companion matrix for each most distinct base dichotomy matrix;

ordering the most distinct base dichotomy matrices and their associated companion matrices from the most compact to the least compact to form a base level of matrices;

sequentially intersecting higher numbers of matrices from the base level to build intersection levels of matrices; and creating a hierarchical arrangement of matrices beginning with the base level of matrices at a first level and proceeding to the highest intersection level of matrices.

8. The method according to claim 7 wherein the step of selecting the most distinct base dichotomy matrices, comprises the steps of:

developing a degree of similarity number for each pair of base dichotomy matrices;

separating the base dichotomy matrices into clusters of base dichotomy matrices in accordance with a threshold degree of similarity numbers; and selecting the most representative base dichotomy matrix from each cluster as one of the most distinct base dichotomy matrices.

9. The method according to claim 7 wherein the step of selecting the roots of the full description set of matrices, comprises the steps of:

sequentially designating base dichotomy matrices and their companion matrices from the base level of matrices in a descending order of compactness;

determining if the subset of logical "1's" for a designated matrix is a root;

determining if the subset of logical "1's" for a higher level of intersection matrix is an unverified root;

determining if the unverified root is an actual root; and performing the above steps until a root for the least compact base dichotomy matrix has been established.

10. A method for analyzing an object to determine a zone within the object exhibiting a highest level of structural similarity to a target zone within the object comprising the steps of:

measuring a physical property of the object at a plurality of different locations to construct a data field; digitizing the data within the data field;

arranging the data within the data field into a matrix;

developing a target dichotomy matrix from the matrix;

transforming the data within the matrix to develop transformation matrices;

developing a base dichotomy matrix from each transformation matrix;

developing a full description set of matrices from the base dichotomy matrices;

developing the branches of the full description set of matrices utilizing the target dichotomy matrix; and displaying the branches to provide a representation of a zone within the object exhibiting a highest level of structural similarity to a target zone within the object.

11. The method according to claim 10 wherein the step of developing a target dichotomy matrix, comprises the steps of:

placing a boundary around a target zone within the matrix;

assigning a logical "1" to any data within the target zone; and assigning a logical "0" to any data outside the target zone.

12. The method according to claim 10 wherein the steps of measuring and digitizing comprise measuring physical properties of the object at a plurality of different locations to construct data fields and digitizing the data within the data fields.

13. The method according to claim 12 wherein the step of arranging comprises arranging the data of each data field into a matrix.

14. The method according to claim 13 wherein the step of transforming comprises applying at least one transform function to the data within each matrix to develop transformation matrices.

15. The method according to claim 10 wherein the step of transforming comprises applying a plurality of transform functions to the data within the matrix to develop transformation matrices.

16. The method according to claim 10 wherein the step of developing a base dichotomy matrix from each transformation matrix, comprises the steps of:

calculating a median value for a transformation matrix;

assigning a logical "0" to any transformed data within the transformation matrix less than the median value;

assigning a logical "1" to any transformed data within the transformation matrix greater than the median value;

randomly assigning logical "1's" and logical "0's" to any transformed data within the transformation matrix equaling the median value; and repeating the above steps for each transformation matrix.

17. The method according to claim 10 wherein the step of developing a full description set of matrices from the base dichotomy matrices, comprises the steps of:

determining a degree of overlap number for each base dichotomy matrix;

selecting each base dichotomy matrix having a degree of overlap number above a threshold degree of overlap number;

sequentially intersecting higher numbers of selected base dichotomy matrices to build levels of intersection matrices;

determining a degree of overlap number for each intersection matrix;

designating each intersection matrix having a degree of overlap number above the threshold degree of overlap number;

determining a measure of similarity number for each designated intersection matrix;

forming the full description set of matrices from the selected base dichotomy matrices and from the designated intersection matrices having a measure of similarity number above a threshold measure of similarity number; and arranging the matrices of the full description set hierarchically beginning with the most compact selected base dichotomy matrix and proceeding to the highest level of intersection matrix.

18. The method according to claim 17 wherein the step of developing the branches of the full description set of matrices, comprises the steps of:

sequentially designating same level intersection matrices in a descending order of similarity to the target dichotomy matrix;

selecting as a branch member the subset of logical "1's" of the next lower level intersection matrix into which the subset of logical "1's" of a designated matrix internests;

substituting the selected branch member for the designated matrix to create a new designated matrix;

sequentially selecting branch members and substituting the selected branch member for the designated matrix until the lowest level of the hierarchy of matrices is reached;

sequentially designating lower levels of intersection matrices in a descending order of similarity to the target dichotomy matrix and performing the above steps of selecting and substituting until the lowest level is reached.

19. An apparatus for analyzing an object to determine a zone within the object exhibiting a highest level of structural organization, comprising:

means for measuring a physical property of the object at a plurality of different locations to construct a data field; means for digitizing the data within the data field;

means for arranging the data within the data field into a matrix;

means for transforming the data within the matrix to develop transformation matrices;

means for developing a base dichotomy matrix from each transformation matrix;

means for developing a full description set of matrices from the base dichotomy matrices;

means for selecting the roots of the full description set of matrices;

means for organizing the roots into sequences; and means for displaying the root sequences to provide a representation of a zone within the object exhibiting a highest level of structural organization.

20. The apparatus according to claim 19 wherein said means for measuring measures a plurality of physical properties of the object at a plurality of different locations to construct data fields.

21. The apparatus according to claim 20 wherein said means for arranging arranges the data within each data field into a matrix.

22. The apparatus according to claim 21 wherein said means for transforming applies at least one transform function to the data within each matrix to develop transformation matrices.

23. The apparatus according to claim 19 wherein said means for developing a base dichotomy matrix from each transformation matrix, comprises:

means for calculating a median value for a transformation matrix;

means for assigning a logical "0" to any transformed data within the transformation matrix less than the median value;

means for assigning a logical "1" to any transformed data within the transformation matrix greater than the median value; and means for randomly assigning logical "1's" and logical "0's" to any transformed data within the transformation matrix equaling the median value.

24. The apparatus according to claim 19 wherein said means for developing a full description set of matrices from the base dichotomy matrices, comprises:

means for selecting the most distinct base dichotomy matrices;

means for developing a companion matrix for each most distinct base dichotomy matrix;

means for ordering the most distinct base dichotomy matrices and their associated companion matrices from the most compact to the least compact to form a base level of matrices;

means for sequentially intersecting higher numbers of matrices from the base level to build intersection levels of matrices; and means for creating a hierarchical arrangement of matrices beginning with the base level of matrices at a first level and proceeding to the highest intersection level of matrices.

25. The apparatus according to claim 24 wherein said means for selecting the most distinct base dichotomy matrices, comprises:

means for developing a degree of similarity number between each pair of base dichotomy matrices;

means for separating the base dichotomy matrices into clusters of base dichotomy matrices in accordance with a threshold degree of similarity number; and means for selecting the most representative base dichotomy matrix from each cluster as one of the most distinct base dichotomy matrices.

26. The apparatus according to claim 24 wherein said means for selecting the roots of the full description set of matrices, comprises:

means for sequentially designating base dichotomy matrices and their companion matrices from the base level of matrices in a descending order of compactness;

means for determining if the subset of logical "1's" for a designated matrix is a root;

means for determining if the subset of logical "1's" for a higher level of intersection matrix is an unverified root; and means for determining if the unverified root is an actual root.

27. An apparatus for analyzing an object to determine a zone within the object exhibiting a highest level of structural similarity to a target zone within the object, comprising:

means for measuring a physical property of the object at a plurality of different locations to construct a data field;

means for digitizing the data within the data field;

means for arranging the data within data field into a matrix;

means for developing a target dichotomy matrix from the matrix;

means for transforming the data within the matrix to develop transformation matrices;

means for developing a base dichotomy matrix from each transformation matrix;

means for developing a full description set of matrices from the base dichotomy matrices;

means for developing the branches of the full description set of matrices utilizing the target dichotomy matrix; and means for displaying the branches to provide a representation of a zone within the object exhibiting a highest level of structural similarity to a target zone within the object.

28. The apparatus according to claim 27 wherein said means for developing a target dichotomy matrix, comprises:

means for placing a boundary around a target zone within the matrix;

means for assigning a logical "1" to any data within the target zone; and means for assigning a logical "0" to any data outside the target zone.

29. The apparatus according to claim 27 wherein said means for measuring measures a plurality of physical properties of the object at a plurality of different locations to construct data fields.

30. The apparatus according to claim 29 wherein said means for arranging arranges the data within each data field into a matrix.

31. The apparatus according to claim 21 wherein said means for transforming applies at least one transform function to the data within each matrix to develop transformation matrices.

32. The apparatus according to claim 27 wherein said means for developing a base dichotomy matrix from each transformation matrix, comprises:

means for calculating a median value for a transformation matrix;

means for assigning a logical "0" to any transformed data within the transformation matrix less than the median value;

means for assigning a logical "1" to any transformed data within the transformation matrix greater than the median value; and means for randomly assigning logical "1's" and logical "0's" to any transformed data within the transformation matrix equaling the median value.

33. The apparatus according to claim 27 wherein said means for developing a full description set of matrices from the base dichotomy matrices, comprises:

means for determining a degree of overlap number for each base dichotomy matrix;

means for selecting each base dichotomy matrix having a degree of overlap number above a threshold degree of overlap number;

means for sequentially intersecting higher numbers of selected base dichotomy matrices to build levels of intersection matrices;

means for determining a degree of overlap number for each intersection matrix;

means for designating each intersection matrix having a degree of overlap number above the threshold degree of overlap number;

means for determining a measure of similarity number for each designated intersection matrix;

means for forming the full description set of matrices from the selected base dichotomy matrices and designated intersection matrices having a measure of similarity number above a threshold measure of similarity number; and means for arranging the matrices of the full description set hierarchically beginning with the most compact selected base dichotomy matrix and proceeding to the highest level of intersection matrix.

34. The apparatus according to claim 33 wherein means for developing the branches of the full description set of matrices, comprises:

means for sequentially designating same level intersection matrices in a descending order of similarity to the target dichotomy matrix;

means for sequentially selecting as a branch member the subset of logical "1's" of the next lower level intersection matrix into which the subset of logical "1's" of a designated matrix internests;

means for substituting the selected branch member for the designated matrix to create a new designated matrix; and means for sequentially designating lower levels of intersection matrices in a descending order of similarity to the target dichotomy matrix and performing the above steps of selecting and substituting until the lowest level is reached.

* * * * *